UNITED STATES PATENT OFFICE.

JOSE FELIX TRONCONI, OF BUENOS AIRES, ARGENTINA.

CANNING FOOD PRODUCTS.

1,348,824.  Specification of Letters Patent.  Patented Aug. 3, 1920.

No Drawing.  Application filed August 27, 1919. Serial No. 320,265.

*To all whom it may concern:*

Be it known that I, JOSE FELIX TRONCONI, a citizen of the Argentine Republic, residing at Calle Maipú 671, Buenos Aires, Argentine Republic, have invented new and useful Improvements in Canning Food Products, of which the following is a specification.

This invention relates to certain improvements which I have devised in the method of canning food products including meat as a main ingredient.

As is well known, the goods to be preserved are made up in cans of tin plate, by simply introducing the same into the cans or containers which after exhausting therefrom the air, are closed and soldered by the usual process. A serious objection to this primitive method is that the contents of the can remain in direct contact with the tin plate. Owing to this, when the solder of tin or like material contains lead, the qualities of the product are altered to such an extent as to convert the canned goods into a poisonous product often of sufficient strength to cause even fatal results, as has been verified in a great number of cases. On the other hand, canned food products and in particular those manufactured with meat as main ingredient, according to actual practice, must either be extracted or removed from the can by pieces or the can must be tipped and the contents emptied on a dish. However, when proceeding in one way or the other, generally only an unshapely heap of the respective product is obtained, unsuitable for being preserved during any period of time outside the can and the appearance of which in the whole is not very attractive.

This invention has for object to eliminate the above objections and offers besides the advantage of enabling the contents of a can to be extracted therefrom in the shape of a single compact block, provided with a wrapper, a fact which not only assists in preserving the product within and without the can or other container, but also facilitates its being cut up into slices by means of a knife, by hand or by any machine of the types actually employed for dealing with cold cuts.

The invention substantially consists in placing into the can or other container a lining or wrapper formed of gut in such a way that when the receiver is closed, the material preserved therein, will be entirely wrapped in said lining of gut. By this means, the direct contact of the product to be preserved with the walls of the tin or can is prevented, and when opening said container, the contents may be extracted therefrom in form of a whole block, wrapped in the said gut, so that such block of wrapped meat or the like may be cut into slices or otherwise dealt with without difficulty.

It will be understood that the envelop or wrapper of gut may suitably be applied whatever be the form or capacity of the can or tin.

The process adopted for canning the goods, except as to the arrangement of the wrapper or lining of gut, will be the same as that adopted heretofore, that is, the bottom and inner walls of the tin or can having been lined with gut in one or several pieces, the goods to be preserved are introduced and after the container being filled, the upper protruding ends of the gut are folded down on the goods so as to cover the top surface of same, so that the product will be entirely covered by said wrapper or lining. After this, air is exhausted from the container by the usual means and the can is tightly sealed by solder or otherwise.

Having now described my invention, I declare that what I claim and desire to secure by Letters Patent, is:

The improvement in the process of canning food products, including meat as a main ingredient, substantially consisting in providing the can or container with a lining of gut in its interior, in such a way that after introducing the product to be preserved, the latter will be entirely wrapped in the lining of gut, thereby preventing the direct contact of the preserved product with the can and providing at the same time a means for extracting the contents from the cans as an entirely wrapped block, adapted to be readily cut into slices as common cold cuts, substantially as described and for the purposes set forth.

JOSE FELIX TRONCONI.

Witnesses:
 A. L. BELLO,
 R. LUAREY.